United States Patent [19]
Loce

[11] Patent Number: 5,359,423
[45] Date of Patent: Oct. 25, 1994

[54] METHOD FOR STATISTICAL GENERATION OF DENSITY PRESERVING TEMPLATES FOR PRINT ENHANCEMENT
[75] Inventor: Robert P. Loce, Rochester, N.Y.
[73] Assignee: Xerox Corporation, Stamford, Conn.
[21] Appl. No.: 169,565
[22] Filed: Dec. 17, 1993
[51] Int. Cl.$^5$ .............................................. H04N 1/21
[52] U.S. Cl. .................................................. 358/296
[58] Field of Search ............... 358/296, 298, 300, 302, 358/400, 401, 445; 346/108, 107 R, 76 L, 160

[56] References Cited

U.S. PATENT DOCUMENTS

| | | |
|---|---|---|
| 4,437,122 | 3/1984 | Walsh et al. ........................ 358/166 |
| 4,460,909 | 7/1984 | Bassetti ............................... 346/160 |
| 4,544,264 | 10/1985 | Bassetti et al. ..................... 355/14 R |
| 4,544,922 | 10/1985 | Watanabe et al. ................... 340/728 |
| 4,625,222 | 11/1986 | Bassetti et al. ..................... 346/160 |
| 4,814,890 | 3/1989 | Kato .................................... 358/280 |
| 4,841,375 | 6/1989 | Nakajima et al. ................... 353/280 |
| 4,847,641 | 7/1989 | Tung ................................... 346/154 |
| 4,933,689 | 6/1990 | Yoknis ................................ 346/154 |
| 5,005,139 | 4/1991 | Tung ................................... 364/519 |
| 5,029,108 | 7/1991 | Lung .................................... 364/519 |
| 5,134,495 | 7/1992 | Frazier et al. ....................... 358/298 |
| 5,138,339 | 8/1992 | Curry et al. ......................... 346/108 |
| 5,142,374 | 8/1992 | Tajika et al. ........................ 358/298 |
| 5,150,311 | 9/1992 | Long et al. .......................... 395/108 |
| 5,161,035 | 11/1992 | Muramatsu ......................... 358/451 |
| 5,193,008 | 3/1993 | Frazier et al. ....................... 358/298 |
| 5,206,741 | 4/1993 | Shimura et al. ..................... 358/404 |
| 5,282,051 | 1/1994 | Walker ................................ 358/401 |
| 5,293,254 | 3/1994 | Eschbain ............................. 358/445 |

OTHER PUBLICATIONS

James C. Stoffel et al., *A Survey of Electronic Techniques for Pictorial Image Reproduction*, IEEE Transactions on Communications, vol. Com–29, No. 12, Dec. 1981.
L. Steidel *Technology Overview: Resolution Enhancement Technologies for Laser Printers*, Lasermaster Corp., Sep. 1991.
Robert P. Loce et al., *Facilitation of Optimal Binary Morphological Filter Design via Structuring Element Libraries and Design Constraints*, Optical Engineering, vol. 31, No. 5, May 1992, pp. 1008–1025.
Edward R. Dougherty ed., Marcel Dekker 1992, *Mathematical Morphology in Image Processing*, pp. 43–90.
Robert P. Loce et al., *Optimal Morphological Restoration: The Morphological Filter Mean–Absolute–Error Theorem*, Journal of Visual Communications and Image Representation, (Acadamic Press), vol. 3, No. 4, Dec. 1992, pp. 412–432.
Edward R. Dougherty et al., *Optimal Mean–Absolute–Error Hit–or–Miss Filters: Morphological Representation and Estimation of the Binary Conditional Expectation*, Optical Engineering, vol. 32, No. 4, Apr. 1993, pp. 815–827.
Donald L. Ort *Character Edge Smoothing for Matrix Printing*, Xerox Disclosure Journal, vol. 6, No. 1, Jan.-/Feb. 1981, pp. 19.
XDJ, vol. 5, No. 1, Jan./Feb. 1980, pp 115–116.
Torry Pines Research, *Behind Hewlett–Packard's Patent on Resolution Enhancement Technology*, (Becky Colgan ed., BIS CAP Intl 1990) pp. 1–60.
Dp-Tek, Inc., *TruRes Resolution Transformation Technology*, 6 pages, May 27, 1993.
Adam L. Carley, PhD., *Resolution Enhancement in Laser Printers*, XLI Corp., Woburn, Mass., 1993, pp. 1–16.
Yidong Chen et al., *Document Restoration using Optimal Iterative Morphological Filters*, IS&T Proceedings, 46th Annual Conf., May 9–14, 1933 (Boston), 4 pages.
William H. Press, et al., *Numerical Recipes in C*, Cambridge University Press, 1988, pp. 242–249.
Robert P. Loce, *Morphological Filter Mean–Absolute–Error Representation Theorems and their application to Optical Morphological Filter Design*, Center for Imaging Science, Rochester Inst. of Tech. (PhD Thesis), May 1993.

*Primary Examiner*—Mark J. Reinhart
*Attorney, Agent, or Firm*—Duane C. Basch

[57] ABSTRACT

The present invention is a method for automating the design of pattern matching templates used to implement a print quality enhancement filter that preserves image density More particularly, the method is directed to the use of a representative set of page description language decomposed or scanned training documents, and statistical data derived therefrom, in an automated process that generates one or more sets of template-pattern pairs that are used as filters for resolution enhancement and-/or conversion of bitmap images.

18 Claims, 9 Drawing Sheets

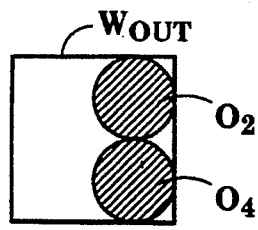
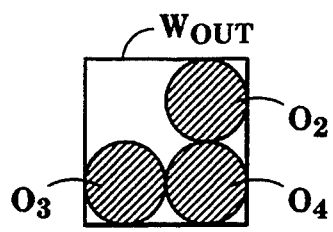
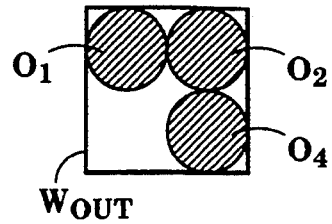
*FIG. 7A*       *FIG. 7B*       *FIG. 7C*
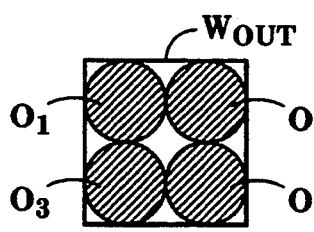
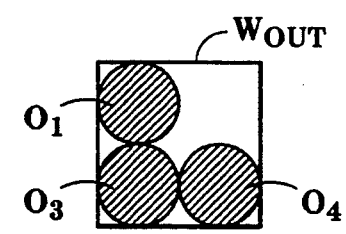
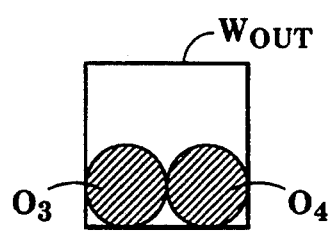
*FIG. 7D*       *FIG. 7E*       *FIG. 7F*
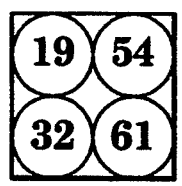
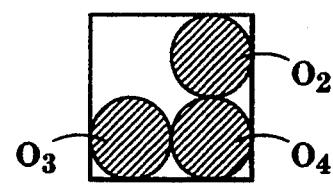
*FIG. 8A*       *FIG. 8B*

METHOD FOR STATISTICAL GENERATION OF DENSITY PRESERVING TEMPLATES FOR PRINT ENHANCEMENT

This invention relates generally to a method for automating the design of pattern matching templates for print quality enhancement, and more particularly to the use of training documents, and statistical data derived therefrom, in an automated process that generates templates for resolution enhancement and/or conversion of bitmap images.

CROSS REFERENCE

The following related applications are hereby incorporated by reference for their teachings:
"Method for Design and Implementation of an Image Resolution Enhancement System That Employs Statistically Generated Look-Up Tables," Loce et al., Ser. No, 08/169,485 (Attny. Docket No. D/93380), filed concurrently herewith;
"Non-Integer Image Resolution Conversion Using Statistically Generated Look-Up Tables," Loce et al., Ser. No.08/170,082 (Attny. Docket No. D/93381), filed concurrently herewith;
"Automated Template Design for Print Enhancement," Eschbach, Ser. No, 08/169,483 (Attny. Docket No. D/93537), filed concurrently herewith; and
"Image Resolution Conversion Method that Employs Statistically Generated Multiple Morphological Filters," Loce et al., Ser. No. 08/169,487 (Attny. Docket No. D/93382), filed concurrently herewith.

COPYRIGHT NOTIFICATION

A portion of the disclosure of this patent document contains material that is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever,

BACKGROUND AND SUMMARY OF THE INVENTION

Information systems for handling numerous document and data formats are moving towards becoming open systems where different devices are tied to one another to provide versatile solutions to a variety of customer needs. A key factor in these open systems is the enabling of electronic documents to be printed such that the customer does not perceive any difference between versions printed on different output devices. In order to achieve complete device-independence, efficient methods of accurately altering image resolution without modifying its appearance are required to take advantage of the technology. Hence, raster conversion and enhancement technology, where a bitmap created on or for a first device is altered so as to be printable on a second output device, has become an important aspect of the open system technology.

The present invention is a method for generating resolution conversion/enhancement filters in the form of templates that may be efficiently employed in look-up tables to improve or maintain document appearance, when converting from an original resolution to an output resolution equal to that of the printing or display device. One aspect of the present invention is that the resulting image signals may be used to drive devices at the output resolution without negatively impacting spatially sensitive features within the input image. In particular, the present invention seeks to preserve image density in the output images produced by incorporating density preservation features into the filter design process. The filtering templates produced using the present invention may be utilized to control a printing device having a scanning beam, where the beam varies in intensity and duration according to the pulses used to control it. As another example, a cathode ray tube uses an electron beam to scan a phosphorous screen. The electron beam may be varied in intensity and duration to accurately display information on the phosphor screen. In both examples, a pulse forming circuit responsive to the output image signal may be used to generate video pulses to control the intensity and operation time of the respective beams.

Previously, various methods and apparatus have been used to alter the resolution of bitmapped images. The following disclosures may be relevant:

U.S. Pat. No. 4,437,122 to Walsh et al. teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. No. 4,544,264 and U.S. Pat. No. 4,625,222, both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. No. 4,690,909 to Bassetti discloses a method and apparatus for enhancing the apparent resolution of electrophotographic printers using a gray dot replacement technique to enhance low resolution output. More specifically, gray or halftone halos are produced along image edges to provide smoothing, while reducing the width of the image regions to avoid thickening thereof as a result of the halo.

U.S. Pat. No. 4,841,375 to Nakajima et al. discloses an image resolution conversion apparatus that converts image data having a predetermined pixel density to a pixel density matching that of a printer so as to enable printing by the printer. The pixel density converter includes: a conversion-pixel position detector for detecting the position of a converted pixel; an original-pixel extractor for extracting a reference original pixel; a conversion-pixel density operation circuit for calculating the density of a conversion pixel; a threshold-value setter for dynamically setting a threshold value; a binary encoding circuit for digitizing the conversion-image density; an input interface for inputting image data; an output interface for outputting image data; and a control circuit for controlling the input/output (I/O) and the conversion operations.

U.S. Pat. No. 4,847,641 and U.S. Pat. No. 5,005,139 to Tung disclose print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 5,029,108 to Lung teaches an edge enhancement method and apparatus for dot matrix devices wherein a group of gradient mask matrices are applied to a matrix of pixels surrounding a "to be adjusted pixel" so as to determine the existence of an edge and the direction of the brightness change. Once determined, the factors are used to generate a code used to modify the to be adjusted pixel in order to enhance the smoothness of a segment transition.

U.S. Pat. No. 5,134,495 to Frazier et al. discloses a laser-based imaging system that employs a resolution transformation method. The method uses the selective activation in overlapping areas between rasters (scan lines). In one embodiment, a single interleaved pixel, between two scan lines, is formed by the sum of up to six laser pulses at pixel points on adjacent scan lines. In some cases the laser pulses are of insufficient intensity to produce a dot or mark at the point on the scan line where the center of the pulse is received.

U.S. Pat. No. 5,150,311 to Long et al. discloses a system for producing print-dot data suitable for driving a hardcopy printing device. More specifically, the print-dot data is selectively obtained from a conversion operation carried out by a matrix and dot generator combination that respectively generate subtractive color components and a pattern of high resolution print-dots therefrom.

U.S. Pat. No. 5,193,008 to Frazier et al. further describes the resolution enhancement apparatus as one that includes the ability to rasterize the image to be printed at twice the resolution of the printer. The printer then outputs the higher resolution image using an interleaving technique that generates developable dots between scan lines by energizing corresponding dots on adjacent scan lines at a level that will not be developed, but where the overlapping portion of the two corresponding dots will be developable.

U.S. Pat. No. 5,206,741 to Shimura et al. discloses an image processing apparatus for processing image data to be output by a printing unit. A conversion unit converts pixel image data within an image memory into data having a resolution equal to the output resolution of the print mechanism.

U.S. patent application Ser. No. 07/513,415, and the corresponding Japanese laid-open patent publication 4-227584 published Aug. 17, 1992, to Mailloux et al. disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics observable in digitally encoded data using conventional magnification techniques.

A number of the previously described patents and publications are summarized in Torrey Pines Research, *Behind Hewlett-Packard's Patent on Resolution Enhancement TM Technology*, (Becky Colgan ed., BIS CAP International, 1990) pp. 1-60, including concepts associated with resolution enhancement.

James C. Stoffel et al. in *A Survey of Electronic Techniques for Pictorial Image Reproduction*, IEEE Transactions on Communications, Vol. COM-29, No. 12, December 1981, incorporated by reference for its teachings, discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

Of particular relevance are the following publications:

Robert P. Loce et al. in *Facilitation of Optimal Binary Morphological Filter Design via Structuring Element Libraries and Design Constraints*, Optical Engineering, Vol. 31, No. 5, May 1992, pp. 1008-1025, incorporated herein by reference, describes three approaches to reducing the computational burden associated with digital morphological filter design. Although the resulting filter is suboptimal, imposition of the constraints in a suitable manner results in little loss of performance in return for design tractability.

*Mathematical Morphology in Image Processing*, pp. 43-90 (Edward R. Dougherty ed., Marcel Dekker 1992), hereby incorporated by reference, describes efficient design strategies for the optimal binary digital morphological filter. A suboptimal design methodology is investigated for binary filters in order to facilitate a computationally manageable design process.

Robert P. Loce et al., in *Optimal Morphological Restoration: The Morphological Filter Mean-Absolute-Error Theorem*, Journal of Visual Communications and Image Representation, (Academic Press), Vol. 3, No. 4, December 1992, pp. 412-432, hereby incorporated by reference, teach expressions for the mean-absolute restoration error of general morphological filters formed from erosion bases in terms of mean-absolute errors of single-erosion filters. In the binary setting, the expansion is a union of erosions, while in the gray-scale setting the expansion is a maxima of erosions. Expressing the mean-absolute-error theorem in a recursive form leads to a unified methodology for the design of optimal (suboptimal) morphological restoration filters. Applications to binary-image, gray-scale signal, and order-statistic restoration on images are included.

Edward R. Dougherty et al., in *Optimal mean-absolute-error hit-or-miss filters: morphological representation and estimation of the binary conditional expectation*, Optical Engineering, Vol. 32, No. 4, April 1993, pp. 815-827, incorporated herein by reference, disclose the use of a hit-or-miss operator as a building block for optimal binary restoration filters. Filter design methodologies are given for general-, maximum-, and minimum-noise environments and for iterative filters.

Robert P. Loce, in *Morphological Filter Mean-Absolute-Error Representation Theorems and Their Application to Optimal Morphological Filter Design*, Center for Imaging Science, Rochester Institute of Technology, (Ph.D. Thesis), May 1993, incorporated herein by reference, discloses design methodologies for optimal mean-absolute-error (MAE) morphological based filters.

In accordance with the present invention, there is provided a method for automatically creating a template-based filter for filtering an image bitmap, wherein the filtering will result in an alteration of the bitmap resolution while preserving the density thereof, comprising the steps of:

(a) generating a first resolution image from a training document and storing the first resolution image in a first bitmap memory;

(b) generating a second resolution image from the training document and storing the second resolution image in a second bitmap memory;

(c) defining an input template window that may be passed through the first bitmap memory;

(d) defining an output pattern window that may be passed through the second bitmap memory, so that the position of the output pattern window within the second bitmap memory is a function of the position of the input template window within the first bitmap memory;

(e) storing, in a database memory, pixel patterns occurring within the input template window and relative frequencies of occurrence of black pixels in individual pixel positions within the output pattern window as the input template window is passed through a plurality of positions within the first bitmap memory; and (f) deriving, from the database memory, a set of template-pattern pairs, wherein each output pattern is representative of a density preserving pixel pattern to be generated in response to the detection of a pattern of pixels within a corresponding input template.

BRIEF DESCRIPTION OF THE DRAWINGS

FIGS. 7A–7F are examples of some possible output patterns occurring within the output window of FIG. 5;

FIGS. 8A and 8B represent the statistical data and resulting output pattern, respectively, generated in response to the examples of FIGS. 7A–7D in accordance with the present invention;

Figure 1:
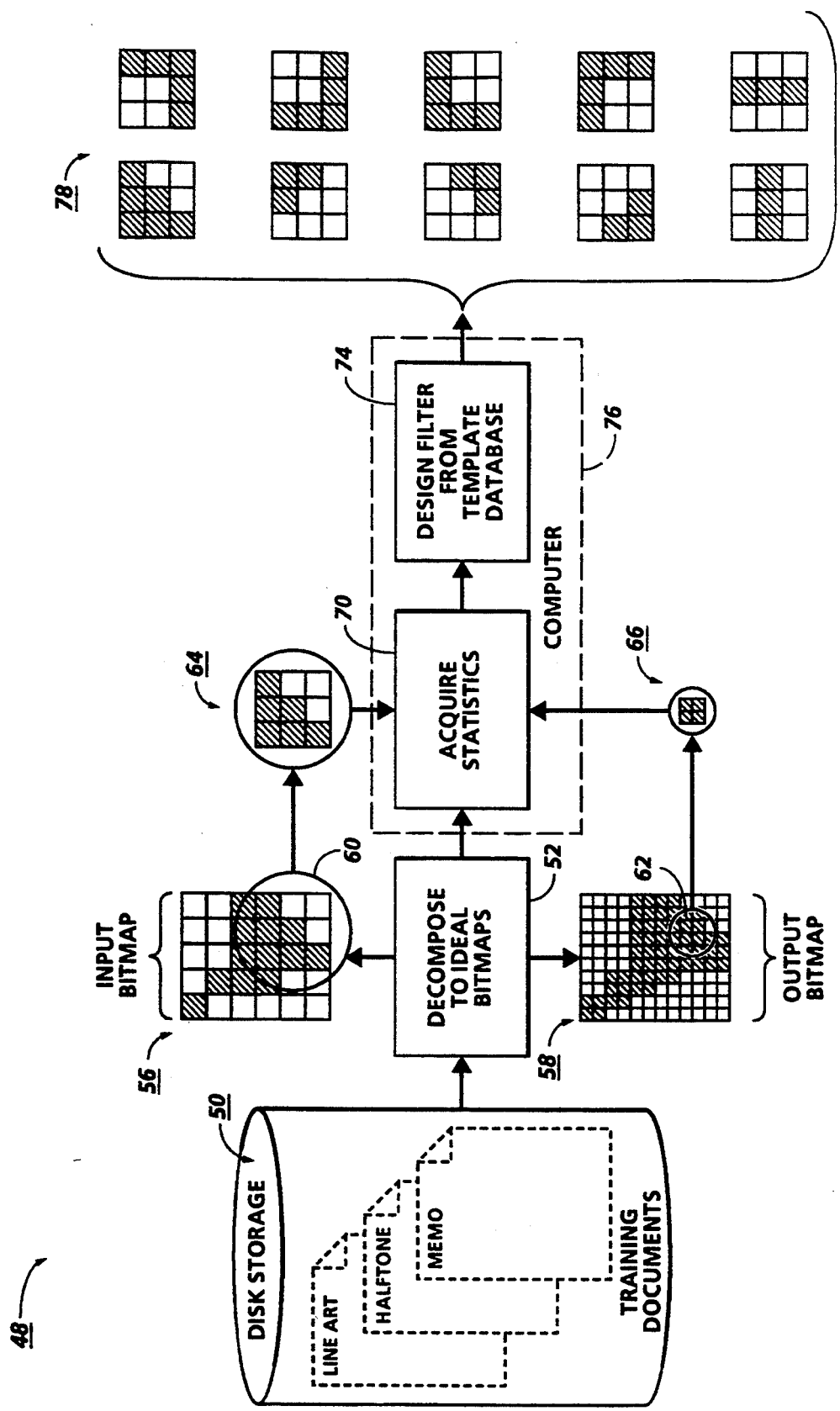
FIG. 1 is a block diagram of a hardware embodiment suitable for implementing the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the operation of the present invention, reference is made to the drawings. In the drawings, like reference numerals have been used throughout to designate identical elements. The terms image signal, video data, ant pixel are used herein to describe discrete digital signals which represent the active (on) or inactive (off) state of an element within a bitmap image. In addition, shaded or cross-hatched portions of image bitmaps depicted herein are intended to represent black or active pixels (possessing a value of 1) within the bitmaps. Such a representation is not intended to limit the present invention, but to simplify the description thereof. Accordingly, the present invention may be operated in the same manner by substituting white pixel states wherever black pixels are indicated, and vice versa.

FIG. 1 shows a block diagram of a hardware embodiment suitable for carrying out the present invention. Many aspects of the present invention may be accomplished or simulated using a programmable computer. Accordingly, the Appendix incorporated as part of this specification includes software code listings for software that was used to implement one or more steps in the present invention with a programmable computer. In addition, the software code listings include calls to an indexing routine (indexx()) described by William H. Press, et al. in *Numerical Recipes in C*, Cambridge Univ. Press, 1988, pp. 242–49.

In FIG. 1, a set of training documents 50, which are preferably electronic documents stored on magnetic disk or similar media, are initially chosen as representative of printed matter that will be generated by the printer. These training document are then digitized, or more appropriately, decomposed at block 52 into a pair of bitmaps 56 and 58. Input bitmap 56 represents the image, or a portion thereof, at a first or input bit resolution (M), whereas output bitmap 58 represents the image at a second (printer) or output bit resolution (N), where the present invention will enable an M-to-N resolution conversion/enhancement.

Figure 2:
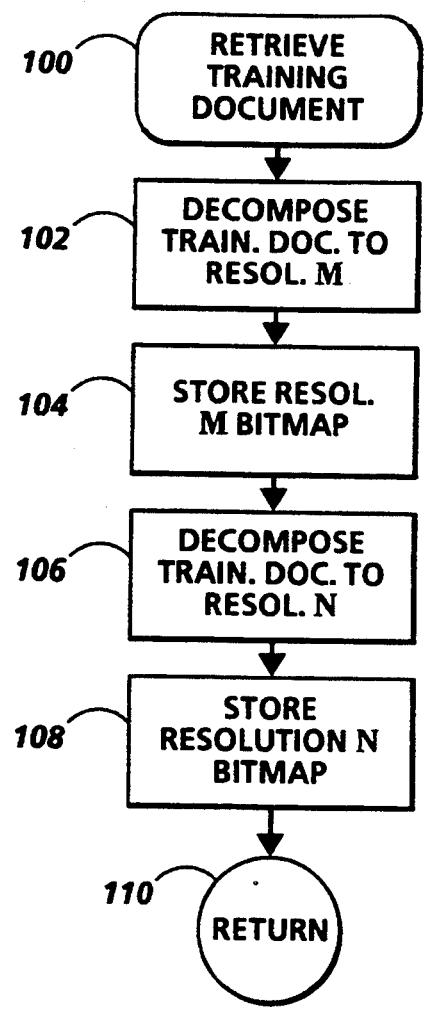
FIG. 2 is a flowchart detailing a portion of the process used to decompose documents in accordance with the embodiment depicted in FIG. 1.

As illustrated in the flowchart of FIG. 2, the decomposition process of block 52 occurs by performing a series of operations to render printable bitmaps from one or more training documents 50. The decomposition process could be performed on a computer platform, such as a SPARC10 ® (manufactured by Sun Microsystems), or may be accomplished by commercially available page decomposition hardware that is commonly employed in laser-based printing machines available for personal and office use. The training documents, which are preferably documents stored in a page description language (PDL) such as Postscript ® (Adobe) or Interpress ® (Xerox) are transformed to bitmap representations by the hardware and/or software systems commonly employed in printers capable of receiving such input. As an example, a commonly known Postscript ® decomposer could be employed to transform the training document input thereto into a series of digital signals representing the bit stream necessary to drive a 300 spot per inch (spi) printer.

The process steps accomplished at bitmap decomposition block 52 start with the retrieval of a training document from the storage media, step 100. Once retrieved, the training document would be stored in temporary memory and supplied to a decomposer at step 102, implemented in either software or hardware as described above. At the decomposer, the training document is decomposed to produce a bitmap at a first resolution M, for example 300 spi. As it is decomposed, the resulting M resolution bitmap is stored in a first bitmap memory, step 104, as illustrated in FIG. 1 as input bitmap 56. Next, a second resolution bitmap is generated in a similar fashion, where the training document is decomposed to produce a bitmap at a second resolution N, for example 600 spi, at step 106. As it is decomposed, the resulting N resolution bitmap is stored in a second bitmap memory, step 108, and as illustrated in FIG. 1 as output bitmap 58.

In a preferred embodiment, the decomposition operation would be carried out for a number of training documents so as to build numerous sets of corresponding input and output bitmap image pairs at the respective M and N resolutions. While not depicted as such in FIG. 1, it should be noted that the resolution of output bitmap 58 may be anamorphic or may consist of multiple-bit-per-pixel representations in accordance with the resolution of the image output device. For example, the slow scan (vertical) resolution may be the same in the two bitmaps while the resolution in the fast scan (horizontal) direction is a multiple of the input resolution (M). Note that other methods may be employed to generate a training set of images. For example, the document may be decomposed to only the higher resolution bit map and the lower resolution bit map may be obtained from it by subsampling, averaging, or some related method. This method has the advantage of ensuring that image structures are properly co-located between the two bit maps. Another alternative concerns starting with a hardcopy form of the training document. The bitmap forms can then be obtained by scanning the hardcopy with a document scanner that is capable of operating at the required resolutions.

Once the decomposition has been completed for input and output resolutions M and N, respectively, the process continues at acquire statistics block 70 of FIG. 1. As illustrated in FIG. 1, the general operation of acquiring statistics, block 70, and designing the filter, block 74, are preferably accomplished by a computer 76. In a preferred embodiment, the computer could be a SPARC10® (Sun Microsystems), which is capable of acquiring statistics from several pages of training documents within a few hours to produce a series of templates, 78. However, less powerful machines could accomplish the tasks in a longer period of time. In general, the acquire statistics block sequentially moves a pair of windows 60 and 62 through the input and output bitmaps, respectively, to locate the corresponding pixel combinations that are produced by the decomposition block for identical regions of the target document. While locating the corresponding input and output combinations, block 70 stores the combinations in a database and collects statistics on the combinations.

Figure 3:
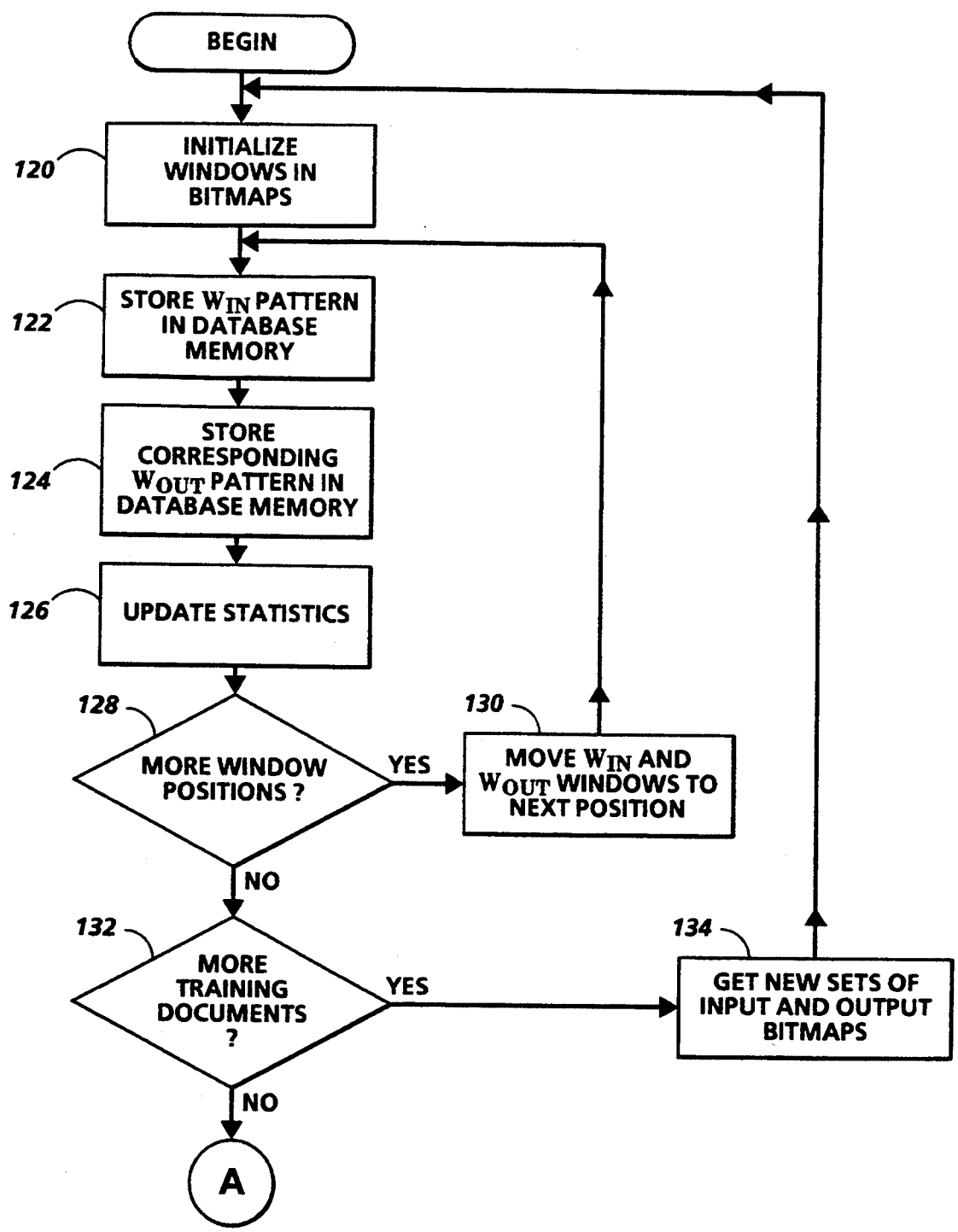
FIG. 3 is a flowchart detailing a portion of the process used to acquire statistics on the decomposed bitmaps in accordance with the embodiment depicted in FIG. 1.
Figure 4:
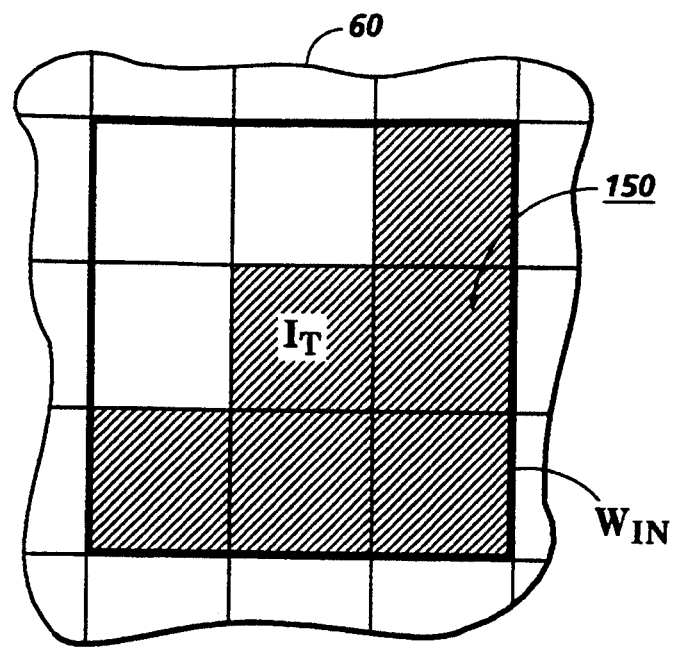
FIGS. 4 and 5 respectively illustrate corresponding positions of the image bitmaps generated by the decomposition operation detailed in FIG. 2.
Figure 5:
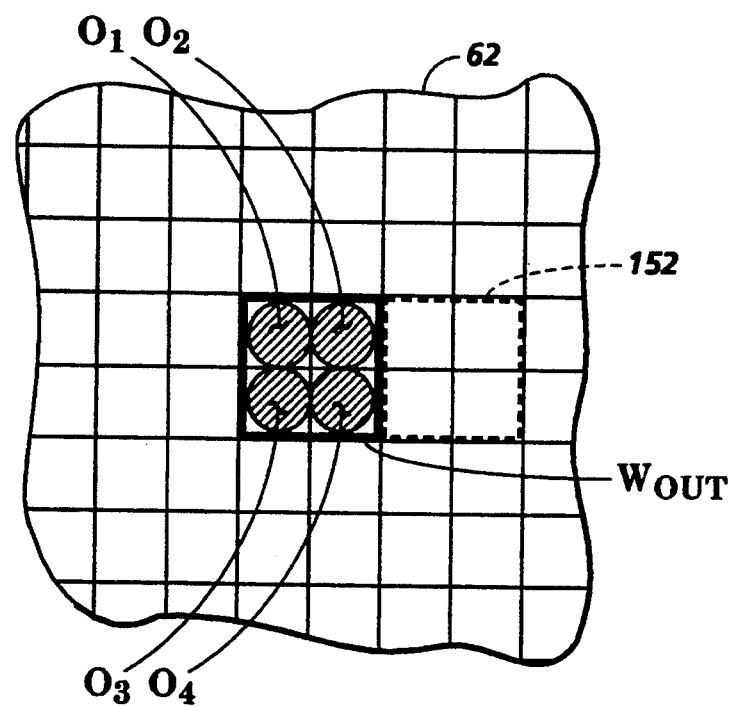

The operation of acquire statistics block 70 is further illustrated in FIG. 3, which is a flowchart depicting the processing steps accomplished by the block. Initially, template and pattern windows are established within both the first and second resolution bitmaps, respectively, step 120. As illustrated in FIGS. 4 and 5, respectively, the input bitmap window, or template window, $W_{IN}$, encloses a plurality of input pixels surrounding an input pixel position $I_T$, while the output pattern window $W_{OUT}$, encloses a series of output pixel positions $O_1$-$O_4$. The example illustrated in FIGS. 4 and 5 is representative of an M-to-N transition where $N=2M$. Thus, for every target input pixel position $I_T$, four output pixels ($O_1$-$O_4$) would have been created within the output bitmap. Alternatively, a larger input window $W_{IN}$ may be used to provide more context for the transformation. Also, pixels for more, or fewer, output pixel positions (i.e., a different sized or shaped output pattern window, $W_{OUT}$) may be generated in association with the input window.

Returning to FIG. 3, once the template window and pattern window have been established, the pattern of pixels within both windows (e.g., the template representing the binary states of the pixels in a window) are associated with one another and an entry representing the pixel patterns occurring in the input template window is stored in a database, as represented by steps 122 and 124, assuming that an identical $W_{IN}$ pattern has not been previously detected. Subsequently, occurrence fields associated with each of the output pattern positions ($O_1$-$O_4$) are incremented from an initial zero value if the corresponding pixel within the output pattern window ($W_{OUT}$) is a black or active pixel.

The purpose of the occurrence fields is to keep track of the number of times that certain pixel positions produce black pixels for a given input template pattern. In subsequent iterations, whenever an identical $W_{IN}$ pattern is already present in the database, occurrence fields associated with the database entry for the $W_{IN}$ pattern are be incremented, step 126, to indicate the occurrence of black pixels within the output pattern window $W_{OUT}$. Thus, the relative frequency of occurrence of black and white pixel states is known, or can be calculated, from the stored occurrence field information. Use of the data base in this manner enables the collection of statistical information with respect to the individual pixels most frequently produced in response to a given pattern of pixels in the input template. As an example, the following is a partial representation of the output patterns detected for the input template pixel pattern illustrated in FIG. 4, and the associated output patterns illustrated in FIGS. 7A-7F, respectively:

|         | INPUT      | OUTPUT | Occurrences |
|---------|------------|--------|-------------|
| FIG. 7A | 001011111  | 0101   | 20          |
| FIG. 7B | 001011111  | 0111   | 18          |
| FIG. 7C | 001011111  | 1101   | 9           |
| FIG. 7D | 001011111  | 1111   | 7           |
| FIG. 7E | 001011111  | 1011   | 3           |
| FIG. 7F | 001011111  | 0011   | 4           |

Moreover, the above would be condensed so as to produce a database entry as follows:

|         | INPUT     | Input Occurrences | Output Occurrence Fields ||||
|---------|-----------|-------------------|-------|-------|-------|-------|
|         |           |                   | $O_1$ | $O_2$ | $O_3$ | $O_4$ |
| Entry x | 001011111 | 61                | 19    | 54    | 32    | 61    |

Once an input template entry has been created, step 128 executes a test to determine if there remain further pixel positions within the first and second resolution bitmaps that have not been processed. If so, step 130 causes the position of windows $W_{IN}$ and $W_{OUT}$ to be advanced to corresponding locations in their respective bitmaps. For example, window $W_{IN}$ would be moved so that the target input pixel position $I_T$ is located at a horizontally adjacent pixel position 150 in FIG. 4, output window $W_{OUT}$ would be moved horizontally to the position indicated by reference numeral 152, and the process steps 122 through 128 would be repeated.

Similarly, step 132 determines if the database being compiled is complete by testing whether the bitmaps generated from all the training documents have been exhausted. If not, the previously described process is repeated for any remaining input and output bitmap pairs. Otherwise, the generation of the template database entries and compilation of statistics is complete.

As illustrated by FIG. 8A, which reflects the occurrence information obtained as described above, the resulting statistical information may be used to determine which output pattern should be produced in response to the given input pattern. This step is accomplished by the final filter design block 74 of FIG. 1. Once the previously described operations of block 70 are complete, there exists a database of input patterns or templates at resolution M that may be used to generate output pixel patterns at resolution N, where the state of the output pixels at resolution N is one that is determined from the template database entries.

Figure 6:
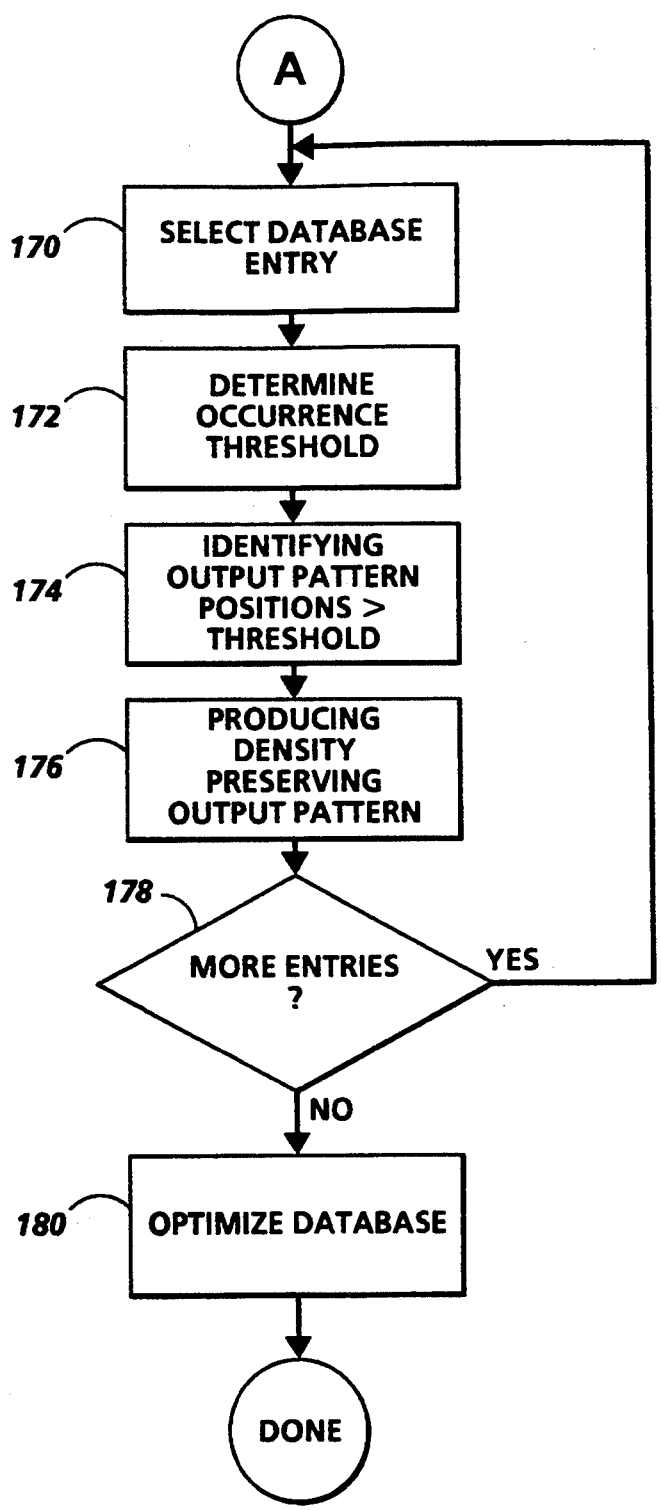
FIG. 6 is a flowchart illustrating various aspects of the process used to automatically design the enhancement filter in accordance with the present invention.

As illustrated in the flowchart of FIG. 6, which further describes the details of the filter design operations, for each unique input template pattern entry in the database the occurrence information is analyzed. Specifically, at step 170 a database entry is selected for analysis. Next, an occurrence threshold is determined for the entry as a function of the number of occurrences of the input template pattern. To design a filter that achieves the same input/output density relationship as the training set, the threshold is chosen to be one-half of the number of occurrences of the input template (step 172). Other functions of the number of occurrences can be used for the threshold if a density change is desired. At step 174, the threshold is applied to the output pixel field and those output pixels that have occurred in an activated state more times than the threshold are chosen to be activated in the output pattern, and conversely for the pixels that have been activated fewer or equal times to the threshold. Subsequently, at step 176, the identified output pixel positions are used to produce the density preserving output pattern. In other words, a template pattern pair similar to that depicted in FIG. 8B is produced so that the statistically preferred pattern of output pixels will be generated whenever the input template pattern for that entry is detected in an image that has been input to an image rendering device that possess the filter. In the example used herein, output pixels at positions $O_2$, $O_3$, and $O_4$ would be activated in the output pattern in response to the input pattern found in FIG. 4. The above process is then repeated for each entry in the database, as represented by test step 178 to generate a filter, or look-up table, of input templates and output patterns that may be used in a digital image rendering device.

As an additional step 180, the database may be optimized so as to reduce its size to one that is implementable within a look-up table of a prefixed maximum size and cost, as will be described with respect to FIG. 9. The size reduction may be necessary because, for example, a 3×3 window generates up to 512 possible templates, and a 7×7 window up to $2^{49}$ templates; clearly the latter, and possibly even the former, prohibits practical implementation in a hardware device seeking to minimize memory used for storage of such templates. A partial reduction in size may be achieved by passing the look-up table, which is equivalent to a Boolean logic expression, through a logic reduction algorithm, as described by Dougherty and Loce, in *Optimal Mean-Absolute-Error Hit-or-Miss Filters: Morphological Representation and Estimation of the Binary Conditional Expectation*, Optical Engineering, Vol. 32, No. 4, April 1993, pp. 815–827, previously incorporated by reference. Additional "pruning" of the number of generated template-pattern pairs in the database may be required to further reduce the filter to the maximum allowed size.

One approach to pruning may be taken by first recognizing that the maximum number of templates is not likely to be generated by analysis of the decomposed bitmaps, since only the input template patterns actually occurring in the training documents will be placed into the filter. In the event a detected input template pattern is not within the filter, a default could be to merely replicate the target pixel at the new resolution N. Or, for some applications it may be desirable to replicate an order statistic or weighted average of the input window values. An example of this would be to take the median of the input window values and replicate that value at the output resolution.

Given that at the time of filtering, detected template patterns that were not placed within the filter can be dealt with in a prechosen manner, filter reduction schemes may be employed to prune certain templates out that provide little goodness to the filtering operation when compared to the default operation. Templates that occur very infrequently in the training process will likely contribute little to the goodness of the overall output document and performing the default replication for these templates may be considered sufficient. Furthermore, output patterns where the occurrences of activated pixels were near the threshold value will not be statistically much better than replicating the target pixel. A systematic pruning can be performed based on these two statistics: frequency of occurrence and relationship to threshold value (i.e., within a specified range above the threshold value).

As an example of a further or alternative pruning operation that may be carried on at step 180, consider the previous example. Assuming that the threshold to determine if a pixel is active in the output pattern is one-half of the number of input occurrences, the goodness ($G_i$) for template pattern i may be represented as follows:

$$G_i = \sum_{r=1}^{R} (B_r - W_r)$$

where R is the number of pixels in the output window, r indexes each pixel of the output window, $B_r$ is the number of times the $r^{th}$ output pixel is black, and $W_r$ is the number of times the $r^{th}$ output pixel is white.

|  | $O_1$ | $O_2$ | $O_3$ | $O_4$ |
|---|---|---|---|---|
| B(black) | 19 | 54 | 32 | 61 |
| W(white) | 42 | 7 | 29 | 0 |
| $B_r-W_r$ | −23 | 47 | 3 | 61 = 88 |

For Entry x then, where the total number of occurrences for the input template pattern was 61, the resulting goodness contributed by Entry x is the sum of the individual differences, resulting in a goodness G=88. To further prune or reduce the number of templates then, the relative goodness of each template is compared and those that maximize goodness are retained.

As yet another alternative, it may be possible to further reduce or prune the number of templates within the filter by combining those templates that are symmetrically equivalent. It should also be noted that the filter templates designed and optimized by the present invention for a specific M-to-N resolution conversion may also be applied to convert between other bitmap resolutions having a similar M/N ratio.

Figure 9:
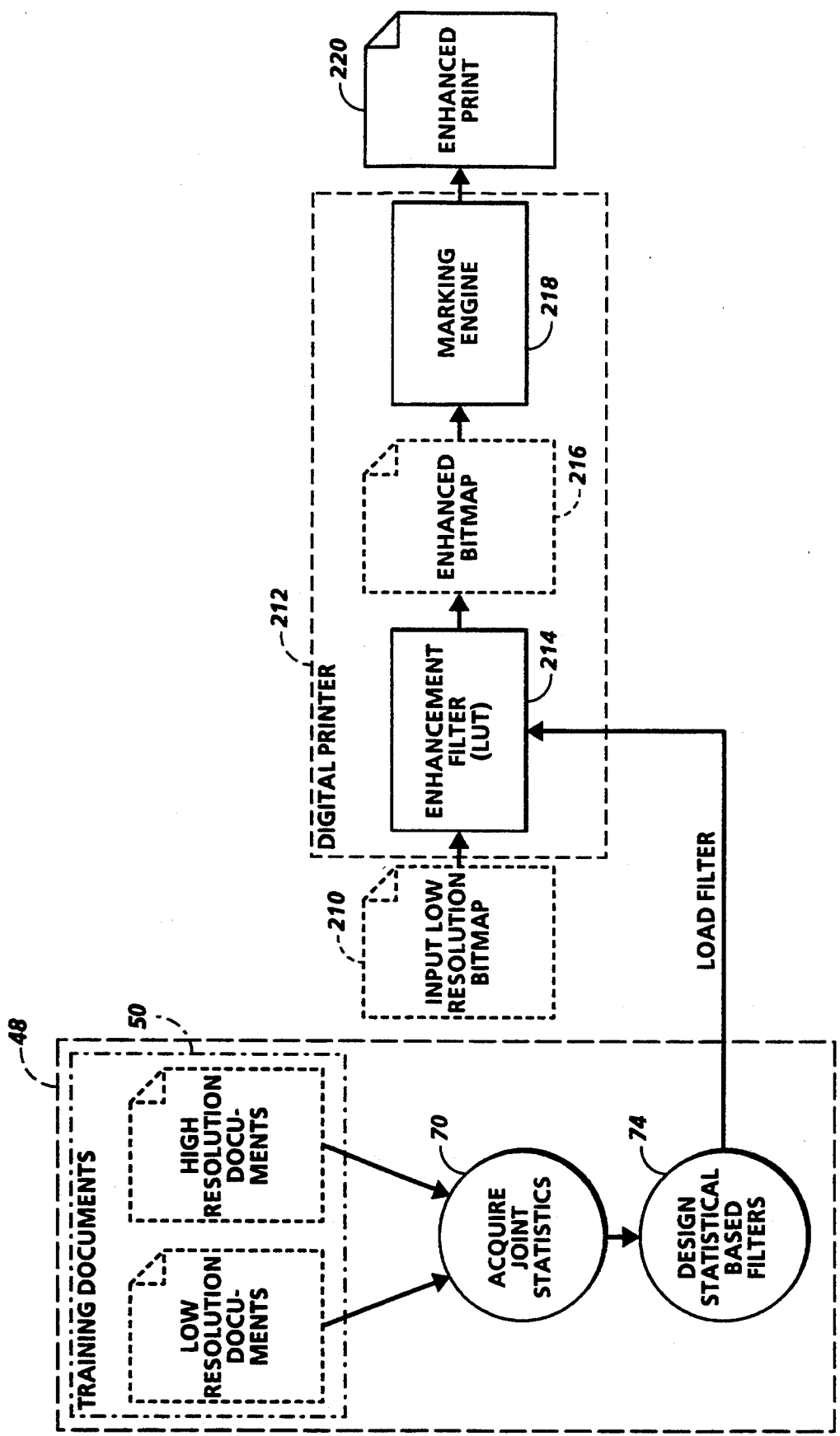
FIG. 9 is a block diagram illustrating the various stages in the process used to design the resolution conversion/enhancement filters of the present invention and further illustrating how such filters may be employed in a digital printer.

Turning now to FIG. 9, once the filters have been designed (FIG. 1, block 70) and optimized by design process 48 a set of statistically designed enhancement filters may be applied by digital printer 212. More specifically, a first resolution bitmap image 210 would be presented to a digital printer 212 to produce printed output at a second resolution. Within a digital printer employing the resolution enhancement/conversion filter produced by the present invention, enhancement filter 214 transforms the input bitmap into an enhanced bitmap image 216. The enhanced bitmap image is then passed to marking engine 218 for exposure and development, as described in the copending application for "Image Resolution Enhancement Using Statistically Generated Look-Up Tables," Loce et al., Ser. No. 08/169,485 (Attny. Docket No. D/93380), previously incorporated by reference, to produce enhanced output print 220.

Figure 10:
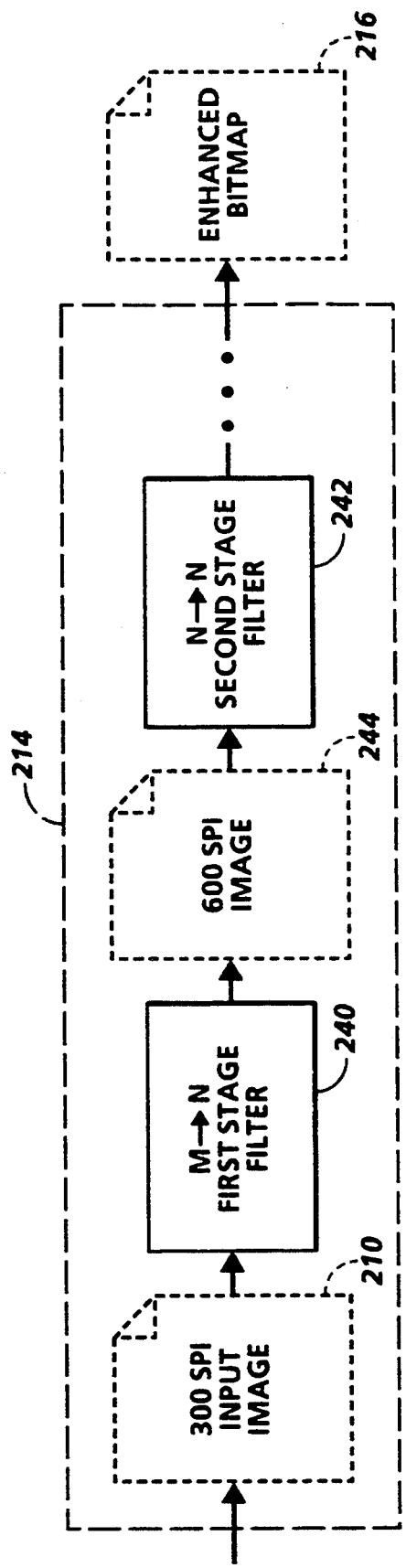
FIG. 10 is a multi-stage embodiment of the enhancement filter illustrated in FIG. 9 in accordance with an alternative method of practicing the present invention.

To further improve the quality of the filtering operation, the overall filter may be designed to include additional, or iterative, filtering operations that are performed on the bitmap after it has been converted to the desired output resolution. As depicted in FIG. 10, two or more stages of filters, 240 and 242 may be applied to convert and enhance the resolution of an input bitmap 210, having a resolution M, to an interim image 244, having a resolution N. Subsequently, additional sequential second stage filters may be applied to further refine or enhance the image, resulting in enhanced bitmap 216. These filtering operations may be template-based, morphological erosion-based, or based on a related operation. For an example of the design procedure for iterative morphological erosion-based filters for same-resolution bitmaps, see Y. Chen, et al., *Document Restoration Using Optimal Iterative Morphological Filters*, IS&T Proceedings, 46th Annual Conference, May 9–14, 1993 (Boston), the relevant portion thereof being hereby incorporated by reference. The method proposed by Chen, et al. may be incorporated in the present invention to further improve the quality of the overall filter output. It must be noted that although Chen et al. perform filter iteration with erosion-based filters extension to template-based filters is possible.

Figure 11:
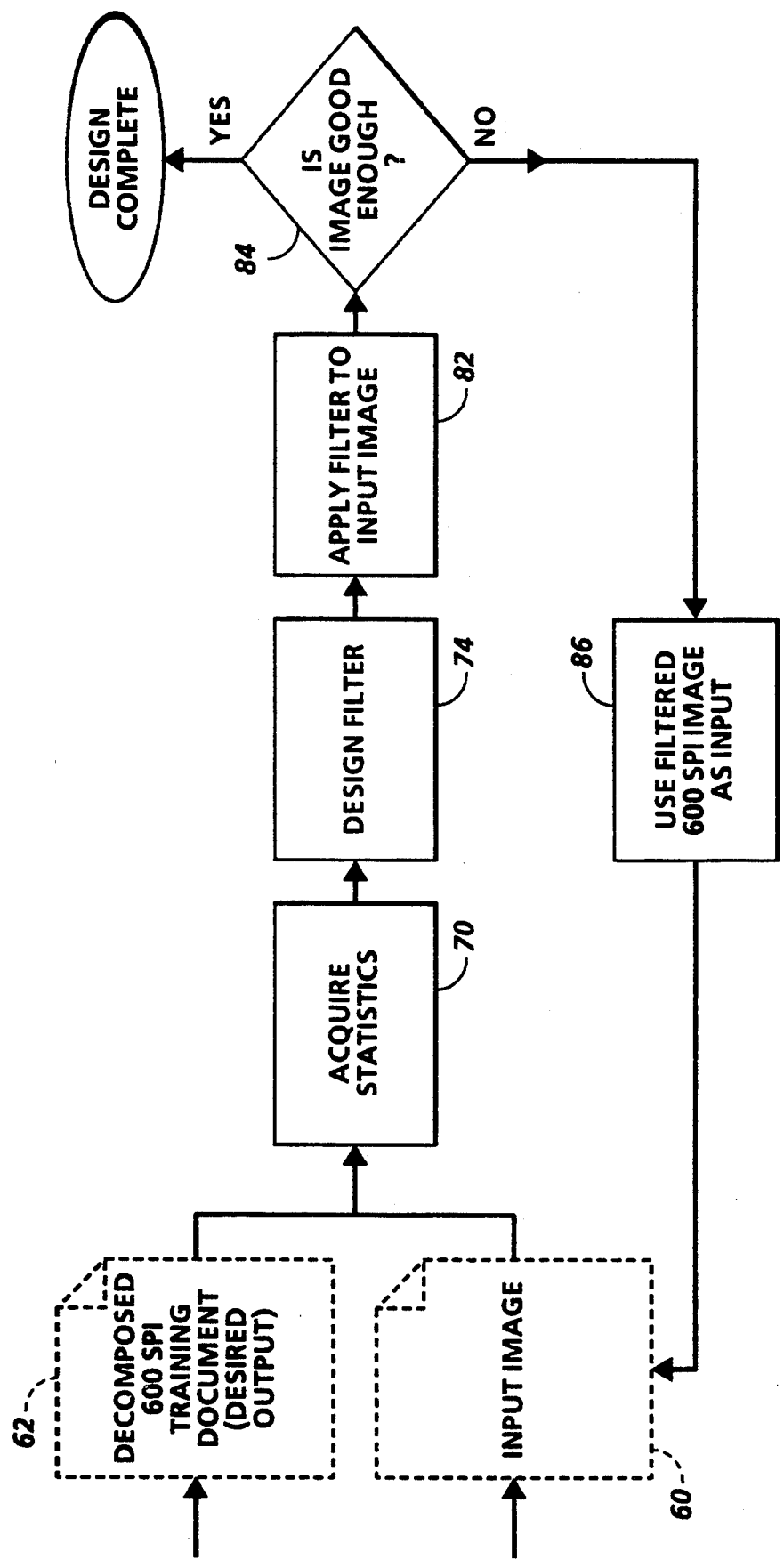
FIG. 11 is a block diagram of an alternative embodiment for the present invention.

FIG. 11 shows an example of the: overall filter design procedure of the present invention in an alternative embodiment where an iteration loop is employed in the design process to generate the second or subsequent stage filters illustrated in FIG. 10. The previously described operations of acquiring statistics, block 70, and designing the filter, block 74 are used in conjunction with an iterative operation represented by blocks 82, 84, and 86. More specifically, block 82 applies the filters previously designed, template filters 78 in FIG. 1, to the input image. The filtered output generated by block 82 is then analyzed to determine if it meets an "overall goodness" test.

The overall goodness of the resulting image is a simple comparison of the pixel positions in the filtered output with those of the ideal or training bitmap at the output resolution N, to determine the number of matching pixels relative to the total number of pixels in the N resolution bitmap. Once calculated, the overall goodness for the first stage filter is then stored for comparison against the overall image goodness produced by a subsequent filter stage. If the overall goodness represents perfection (i.e., an overall goodness of about 100% or 1.0), as determined attest block 84, the filter design process is complete. Otherwise, the design process would be repeated using the filtered output image just produced with the first stage filters as an input image, block 86.

Using the filtered output as the input image, the design process is run again to design one or more second stage filters that will use the template design process previously described. However, for the second and any subsequent stage filters, both input images will be at the output (N) resolution. Using the same resolution images results in templates that generate, or modify, only a single pixel position in the output image. The overall goodness of the second or subsequent stage filters would be determined as it was with the first stage filter, after applying the filter to the input image, block 82, and calculating the relative number of matching pixels in the filtered image. However, text block 84 would then test the overall goodness, not against perfection, but against the overall goodness of the previous filter iteration. The decision as to whether the design process is complete (i.e., no need for additional iterations) would be based upon the amount of change in the overall goodness as compared to the previous iteration. When the amount of change approaches zero, the design process would be complete. Otherwise, as described above, the iterative filter design process could be continued to generate subsequent filter stages which would be applied to an input image to produce an enhanced bitmap as shown in FIG. 9.

In the above description, the present invention has been described with respect to the block diagram of FIG. 1. Many aspects of the present invention may be accomplished using the software code listed in the Appendix incorporated as part of this specification Specifically, the software code listed may be used to generate filter templates in accordance with an embodiment of present invention. In general, the code operates to produce a sorted set of templates suitable for use in a look-up table to implement an enhancement filter as illustrated in FIG. 9. However, the code assumes that the initial training images that are used as input exist at the same spatial resolution. Production of images at the same resolution may be accomplished, for example, by using the phaseout software code contained in "Image Resolution Conversion Method That Employs Statistically Generated Multiple Morphological Filters," by Loce et al, application Ser. No. 08/169,487 (Attny.

Docket No. D/93382), previously incorporated by reference. When the training pair of images are at the same resolution the filter design software is run so as to produce only a single output pixel within the multiple pixel output window. In other words, the code included in the Appendix would need to be run once for each relative sampling phase of the output image. Alternatively, the same-resolution images may be produced as described in "Automated Template Design for Print Enhancement," by Eschbach, application Ser. No. 08/169,483 (Attny. Docket No. D/93537), previously incorporated by reference.

In recapitulation, the present invention is a method for automating the design of pattern matching templates used to implement a print quality enhancement filter, and more particularly to the use of training documents, and statistical data derived therefrom, in an automated process that generates templates for resolution enhancement and/or conversion of bitmap images. Furthermore, the statistical data is used to produce template-pattern pairs that are intended to preserve image density in the bitmap image produced using the filters designed by the present invention.

It is, therefore, apparent that there has been provided, in accordance with the present invention, a method for automating the design of density-preserving pattern matching templates useful in image resolution conversion and/or enhancement. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

APPENDIX

```
/*   This program generates structuring elements that are to be   */
/*   used for hmt filtering.                                      */
/*                                                                */ include <stdio.h>
include <stdlib.h>
#include <math.h>
include <image.h> define MAX_TRAIN 20 /* Maximum number of image training pairs */ extern HEADER *readheader();

main( argc, argv )

int argc;
char *argv[];
{ char *ideal_name[MAX_TRAIN], *noisy_name[MAX_TRAIN],
    *count_name, *mae_name, *win_name, *se_name;

unsigned char *iscans, **nscans, *temptr;

int index[262144], numcor[262144], p[262144][3], window[2][31], intbase[31];

int bps, eachfilt, eachscan, icount, i, j, k, n, next_arg, npat,npat_1,
    maxline, numline, maxpixel, pixbegin, pixend, no,
    npixels, nscanlines, ntrain, numones, numpix;
```

```
int ideal_ptr;
int noisy_ptr;

float err, rnumpix;

FILE *count_ptr;
FILE *se_ptr;
FILE *win_ptr;
FILE *mae_ptr;

HEADER *ideal, *noisy;

void getp(), indexx();

next_arg = 1;

while( next_arg < argc )
  {
  if ((strcmp( argv[next_arg], "-window" ) == 0) ||
     (strcmp( argv[next_arg], "-win" ) == 0))
     {
     next_arg++;
     win_name = argv[next_arg];
     next_arg++;
     }
  else if (strcmp( argv[next_arg] , "-train" ) == 0 )
     {
     next_arg++;
     ntrain = 0;
     }
  else if (strcmp( argv[next_arg] , "-mae" ) == 0 )
     {
     next_arg++;
     mae_name = argv[next_arg];
     next_arg++;
     }
  else if (strcmp( argv[next_arg] , "-count" ) == 0 )
     {
     next_arg++;
     count_name = argv[next_arg];
     next_arg++;
     }
  else if (strcmp( argv[next_arg] , "-se" ) == 0 )
     {
     next_arg++;
     se_name = argv[next_arg];
     next_arg++;
     }
  else
     {
     ideal_name[ntrain] = argv[next_arg];
     next_arg++;
     noisy_name[ntrain] = argv[next_arg];
     ntrain++;
     next_arg++;
```

```
        }
    }
```

```c
/* Read in window file                          */
/* The first index will be for pixels, the second for scan lines */ win_ptr = fopen(win_name, "r");
fscanf( win_ptr, "%d", &no );
maxline = 0;
maxpixel = 0;
for( i = 0; i < no; i++ )
  {
   fscanf( win_ptr, "%d %d", &window[0][i], &window[1][i] );
   if (window[0][i] > maxpixel) maxpixel = window[0][i];
   if (window[1][i] > maxline ) maxline = window[1][i];
  }
/* maxpixel and maxline are the indices of the farthest pixels in  */
/* the scan line. numline is the number of scan line in the window */
numline = 1 + (maxline * 2);
fclose(win_ptr);

/* Shift the window to index the buffered lines */
for( i = 0; i < no; i++ ) window[1][i] += maxline;

/* Initializing Probability Arrays   */
for( i = 0; i < 262143; i++ )
  {
   p[i][0] = 0;
   p[i][1] = 0;
   p[i][2] = 0;
  }

/* Fill binary base array to be used in subroutine getp */
intbase[0] = 1;
for( k = 1; k < 31; k++ ) intbase[k] = 2*intbase[k-1];

npat = 0;
numones = 0;
rnumpix = 0.0;
for( n = 0; n < ntrain; n++ )
  {

/* Open ideal and noisy image files   */ ideal_ptr = open(ideal_name[n], 0);
   ideal = readheader(ideal_ptr);
   noisy_ptr = open(noisy_name[n], 0);
   noisy = readheader(noisy_ptr);
   getheaderfield(ideal,"Raster","pixels",SP_INT,&npixels);
   getheaderfield(ideal,"Raster","scanlines",SP_INT,&nscanlines);
   getheaderfield(ideal,"Encoding","bytes/sl",SP_INT,&bps);
```

```
/* numpix is the total number of ideal pixels examined   */
/* pixbegin and pixend are the first and last(plus 1) ideal */
/* pixels evaluated along a scan line               */ numpix + = (npixels - 2 * maxpixel) * (nscanlines - 2 * maxline);
pixbegin = maxpixel;
pixend = npixels - maxpixel;

/* Allocate array of pointers to scanline data */
nscans = (unsigned char **)
      malloc ((unsigned) numline * sizeof(unsigned char *));

/* Allocate scanline buffers for ideal and noisy data */
iscans = (unsigned char *) malloc ((unsigned)bps*8);
for (eachscan = 0; eachscan < numline; eachscan + +)
   nscans[eachscan] = (unsigned char *) malloc ((unsigned)bps*8);

/* Read the initial ideal scan lines that will not be used */
for( eachscan = 0; eachscan < maxline; eachscan + + )
   readbytes(ideal_ptr, iscans, bps);

/* Read and unpack the initial noisy scan lines */
for( eachscan = 1; eachscan < numline; eachscan + + )
  {
  readbytes(noisy_ptr, nscans[eachscan], bps);
  unpack(nscans[eachscan], nscans[eachscan], bps);
  }

/* Begin looping through the remaining scan lines of the images */
for(eachscan = 2*maxline; eachscan < nscanlines; eachscan + +)
  {

/* Shift noisy scanlines */
  temptr = nscans[0];
  for(eachfilt = 0; eachfilt<(numline-1); eachfilt + +)
     nscans[eachfilt] = nscans[eachfilt + 1];
  nscans[numline-1] = temptr;

/* Read and unpack next scanline */
  readbytes(ideal_ptr, iscans, bps);
  unpack(iscans, iscans, bps);
  readbytes(noisy_ptr, nscans[numline-1], bps);
  unpack(nscans[numline-1], nscans[numline-1], bps);

/* Getting probabilities */ printf("%d number of patterns = %d\n", eachscan, npat);

getp(iscans, nscans, p, window, no, &npat, &numones,
      pixbegin, pixend, intbase);
```

```c
    close(ideal_ptr);
    close(noisy_ptr);
} rnumpix = (float)(numpix);

/* Calculating goodness */
/* numcor contains the number of correct hmt's for pattern i. */
/* It is the number of ideal 1's minus the number of ideal 0's */ for( i = 0; i < npat; i++ ) numcor[i] = p[i][2] - p[i][1];

npat_1 = npat-1;
printf("\nSorting Error\n");
indexx( npat_1, numcor, index );
/* for( i = 0; i <= npat; i++ )
printf("%10d%10d%10d%10d%10d%10d%10d\n",i,p[i][0],p[i][1],p[i][2],numcor[i],index[npat-i],numcor[index[npat-i]]); */ printf("\nGenerating files\n" );
se_ptr = fopen(se_name, "w");
mae_ptr = fopen(mae_name, "w");
count_ptr = fopen(count_name, "w");

k = index[npat_1];
icount = 0;
while (numcor[k] > 0)
  {
   icount++;
   k = index[npat_1-icount];
  }
printf("Number of templates in filter = %d\n", icount);

fprintf( se_ptr, "%d\n", icount );

err = numones;
fprintf( mae_ptr, "%d %g \n", 0, err/rnumpix );
for( i = 0; i < icount; i++ )
  {
   err -= numcor[index[npat_1-i]];
   fprintf( mae_ptr, "%d  %g \n", i + 1, err/rnumpix );
   fprintf( se_ptr, "%d \n", p[index[npat_1-i]][0] );
  } printf( "\nSorting Patterns by Number of Occurances\n" );

for( i = 0; i < npat; i++ ) numcor[i] = p[i][1] + p[i][2];
```

```
indexx( npat_1, numcor, index );

fprintf( count_ptr, " pattern  Num obs   Num 0    Num 1      CE\n" );
for( i = 0; i < npat; i + + )
  {
    fprintf( count_ptr, "%10d% 10d% 10d% 10d% 13.6f\n",
        p[index[npat-i]][0],
        numcor[index[npat-i]],
        p[index[npat-i]][1],
        p[index[npat-i]][2],
        (float)(p[index[npat-i]][2])/(float)(numcor[index[npat-i]]));
  } fclose(mae_ptr);
fclose(se_ptr);
fclose(count_ptr);

exit(0);
}

/*  ************************************************************
 */ void  getp(iscans, nscans, p, window, no, npat, numones,
        pixbegin, pixend, intbase)

int p[262144][3], intbase[], no, *npat, *numones, pixbegin, pixend,
   window[][31];

unsigned char *iscans, **nscans;

{
  int j, k, kpat, n, obs;

/* This routine gets counts of zeroes and ones in the ideal image   */
/* given an observed pattern. The decimal value of the observed    */
/* pattern is "obs" and is stored in p[i][0]. The number of times it */
/* should yield a 0 is "p[i][1]", and the number of times it should  */
/* yield a 1 is p[i][2].                    */
/*                           */ for( j = pixbegin; j < pixend; j + + )
    { obs = 0;
      for( k = 0; k < no; k + + )
        {
          if(nscans[window[1][k]][j + window[0][k]])
            obs + = intbase[k];
        }
```

```
    for( n = 0; n < *npat; n + + )
    {
        if( p[n][0] = = obs )
        {
            kpat = n;
            goto L_25;
        }
    }
    kpat = *npat;
    (*npat) + +;
L_25:
    ;

p[kpat][0] = obs;
    if( !iscans[j] )
    {
        p[kpat][1] + +;
    }
    else
    {
        p[kpat][2] + +;
        (*numones) + +;
    }

}

}
```

I claim:

1. A method for automatically creating a template-based filter for filtering an image bitmap, wherein the filtering will result in an alteration of the bitmap resolution while preserving the density thereof, comprising the steps of:

(a) generating a first resolution image from a training document and storing the first resolution image in a first bitmap memory;

(b) generating a second resolution image from the training document and storing the second resolution image in a second bitmap memory;

(c) defining an input template window that may be passed through the first bitmap memory;

(d) defining an output pattern window that may be passed through the second bitmap memory, so that the position of the output pattern window within the second bitmap memory is a function of the position of the input template window within the first bitmap memory;

(e) storing, in a database memory, pixel patterns occurring within the input template window and relative frequencies of occurrence of black pixels in individual pixel positions within the output pattern window as the input template window is passed through a plurality of positions within the first bitmap memory; and (f) deriving, from the database memory, a set of template-pattern pairs, wherein each output pattern is representative of a density preserving pixel pattern to be generated in response to the detection of a pattern of pixels within a corresponding input template.

2. The method of claim 1, further comprising the step of passing the input template window through all possible positions within the first bitmap memory.

3. The method of claim 1 further including the step of repeating steps (a) through (e) therein for a plurality of training documents prior to deriving the template-pattern pairs at step (f).

4. The method of claim 1 wherein said storing step comprises:

creating an entry in the database memory, the entry including a field for representing a unique pixel pattern occurring within the template window, and a plurality of occurrence fields, representing the number of occurrences of black pixels in each possible pixel position within the output pattern window; and repeating the previous step for each unique pixel pattern occurring within the template window.

5. The method of claim 4, further comprising the step of incrementing a value stored in an occurrence field in an existing database entry whenever a non-unique combination of pixel patterns is detected in the template window.

6. The method of claim 5, wherein said deriving step comprises:

identifying, for each unique template window pattern entry within the database memory, those pixel position fields having an occurrence rate greater than a predetermined threshold; and selecting all pixels positions having an occurrence rate greater than a predetermined threshold to be activated in the output pixel pattern associated with the template window pattern, so as to produce a template-pattern pair therefrom.

7. The method of claim 6, further comprising the step of calculating the predetermined threshold as a function of the number of occurrences of a corresponding input template.

8. The method of claim 7, wherein the predetermined threshold is established as one-half the number of occurrences of the corresponding input template.

9. The method of claim 5 further comprising the step of reducing the size of the database by eliminating less frequently occurring template-pattern pair entries therefrom.

10. The method of claim 6 further comprising the step of reducing the size of the database by eliminating template-pattern pairs having output pixel patterns generated by occurrence rates that are within a specified range above the predetermined threshold entries.

11. The method of claim 1 wherein the step of defining an input template window includes selecting a plurality of non-contiguous pixel positions for inclusion therein.

12. The method of claim 1 further including the step of transferring the template-pattern pairs to a look-up table, so that each template corresponds to a unique location within the look-up table and upon addressing of a unique location the associated output pattern is generated by the look-up table.

13. The method of claim 1 wherein step (e), the step of storing pixel combinations occurring within the input template window stores all such combinations.

14. The method of claim 2, further comprising the steps of:
applying a filter represented by the set of template-pattern pairs to the first resolution image to generate a filtered output image at the second resolution; and
testing the overall goodness of the filtered output image to determine if the performance of the filter is acceptable.

15. The method of claim 14, wherein the step of testing the overall goodness of the filtered output image comprises the steps of:
comparing the filtered output image arid the second resolution image to determine the number of corresponding pixel positions having identical pixel states between the filtered output and second resolution images;
dividing the number of identical pixel states by the total number of pixel positions within the second resolution image to determine a first overall goodness of the filtered output image; and
indicating acceptable goodness only when the first overall goodness is not less than a goodness threshold.

16. The method of claim 14, further comprising the steps of:
(a) storing the filtered output image in the first bitmap memory;
(b) defining the input template window to be passed through the first bitmap memory;
(c) defining the output pattern window as a single pixel window to be passed through the second bitmap memory, so that the position of the output pattern window within the second bitmap memory is a function of the position of the input template window within the first bitmap memory;
(d) storing, in a database memory, pixel patterns occurring within the input template window and the relative frequency of occurrence of black pixels in the single pixel output pattern window as the input template window is passed through a plurality of positions within the first bitmap memory; and
(e) deriving, from the database memory, a second set of template-pattern pairs, wherein each output pixel is representative of a density preserving pixel to be generated in response to the detection of a pattern of pixels within a corresponding input template.

17. The method of claim 16, further comprising the steps of:
applying a filter represented by the second set of template-pattern pairs to the filtered output image to generate a second filtered output image at the second resolution; and
testing the overall goodness of the second filtered output image to determine if the performance of the filter is acceptable.

18. The method of claim 17, wherein the step of testing the overall goodness of the second filtered output image comprises the steps of:
comparing the second filtered output image and the second resolution image to determine the number of corresponding pixel positions having identical pixel states between the filtered output and second resolution images;
dividing the number of identical pixel states by the total number of pixel positions within the second resolution image to determine a second overall goodness of the second filtered output image; and
indicating acceptable goodness for the second filtered output image only when the second overall goodness for the second filtered output image differs from the first overall goodness for the filtered output image by less than a predefined overall goodness error.

* * * * *